United States Patent
Ferrere et al.

(10) Patent No.: US 12,127,275 B2
(45) Date of Patent: Oct. 22, 2024

(54) METHOD FOR CONNECTION TO EQUIPMENT, ASSOCIATED DEVICE

(71) Applicant: Exel Industries, Epernay (FR)

(72) Inventors: Nicolas Ferrere, Paris (FR); Ahmed Baidaoui, Paris (FR); Faouzia Mesbahi, Paris (FR); Louis Maycko, Paris (FR); Ilana Mancel, Paris (FR)

(73) Assignee: EXEL INDUSTRIES, Epernay (FR)

( * ) Notice: Subject to any disclaimer, the term of this patent is extended or adjusted under 35 U.S.C. 154(b) by 386 days.

(21) Appl. No.: 17/539,419

(22) Filed: Dec. 1, 2021

(65) Prior Publication Data

US 2022/0183087 A1 Jun. 9, 2022

(30) Foreign Application Priority Data

Dec. 3, 2020 (FR) ........................................ 2012643

(51) Int. Cl.
*G06F 21/60* (2013.01)
*G06K 7/14* (2006.01)
*H04W 76/11* (2018.01)

(52) U.S. Cl.
CPC ........... *H04W 76/11* (2018.02); *G06F 21/602* (2013.01); *G06K 7/1413* (2013.01); *G06K 7/1417* (2013.01)

(58) Field of Classification Search
CPC .............................. H04W 88/02; G06Q 50/04
See application file for complete search history.

(56) References Cited

U.S. PATENT DOCUMENTS

| 2014/0375422 A1* | 12/2014 | Huber | G07C 9/00571 340/5.61 |
|---|---|---|---|
| 2015/0366124 A1 | 12/2015 | Kremmer et al. | |
| 2020/0015301 A1 | 1/2020 | Zhang et al. | |
| 2020/0178049 A1* | 6/2020 | Suleman | H04W 12/64 |
| 2021/0001061 A1* | 1/2021 | Calderon Oliveras | G16H 20/13 |

FOREIGN PATENT DOCUMENTS

| DE | 10 2014 220448 A1 | 4/2016 |
|---|---|---|
| WO | 2013/100851 A2 | 7/2013 |

OTHER PUBLICATIONS

French Patent Application No. 2012643, INPI Rapport de Recherche Préliminaire, Jul. 19, 2021, 2 pages.
"QR Code", Wikipedia, Dec. 24, 2011, XP055339476. https://en.wikipedia.org/w/index.php?title=QR_code&oldid=467433637.

* cited by examiner

*Primary Examiner* — Kevin Kim
(74) *Attorney, Agent, or Firm* — Soquel Group LLC

(57) ABSTRACT

A method for connecting to equipment by means of an electronic terminal, including an image sensor of the electronic terminal acquiring a visual indicator image displayed by the equipment, the visual indicator including connection identifiers for establishing a communication link with the equipment in coded form, a software application installed on the electronic terminal extracting the connection identifiers from the acquired image, and the connection identifiers establishing a local wireless communication link between a communication interface of the electronic terminal and a communication interface of an electronic controller of the equipment.

11 Claims, 2 Drawing Sheets

METHOD FOR CONNECTION TO EQUIPMENT, ASSOCIATED DEVICE

CROSS-REFERENCE TO RELATED APPLICATIONS

This application claims priority of French Patent Application No. 20 12643, filed on Dec. 3, 2021.

FIELD OF THE INVENTION

The present invention relates to a method for connecting to equipment. The invention also relates to a device for implementing such a connection method.

The invention is particularly applicable to industrial or agricultural equipment such as machine tools or agricultural machinery, for example, to make it possible for a user to access data relating to the equipment, such as data relating to the operation or maintenance of the equipment, in a secure manner, or even to control this equipment remotely, although many other applications are possible.

BACKGROUND OF THE INVENTION

In many applications, such as in the case of industrial or agricultural machinery, an electronic controller is embedded in the machine. This electronic controller is in communication with a remote computer server, such as a server managed by the owner or manager of the machine, to exchange data generated by the machine. A user can then access this data by connecting to the server.

One disadvantage is that it is necessary to establish a secure communication link between the machine and the computer server. This can be complicated to implement in certain circumstances, such as for reasons of cost or for practical reasons. On the one hand, it is necessary to ensure that only authorized persons can connect. On the other hand, in some environments, especially in industrial or agricultural applications, it is sometimes the case that no connection to a remote computer server can be established, because the agricultural machine is located in an area without adequate network coverage, for example.

SUMMARY OF THE DESCRIPTION

The invention more intends to remedy these disadvantages in particular by proposing a method for establishing a communication link between equipment and an electronic terminal in a simple and secure manner.

To this end, one aspect of the invention relates to a method for connecting to equipment by means of an electronic terminal, this method comprising steps consisting of:
  an image sensor of the electronic terminal acquiring a visual indicator image displayed by an item of equipment, the visual indicator comprising connection identifiers, in encoded form, for establishing a communication link with the equipment;
  a software application on the electronic terminal extracting the connection identifiers from the acquired image
  the connection identifiers establishing a local wireless communication link between a communication interface of the electronic terminal and a communication interface of an electronic controller of the equipment.

According to advantageous but not mandatory aspects, such a monitoring system may incorporate one or more of the following features, taken alone or in any technically permissible combination:

The communication link is a radio link, preferably short range, such as a Bluetooth or Wi-Fi link.
  The connection identifiers are encrypted in the visual indicator, in which extraction of the connection identifiers from the acquired image involves the use of encryption information contained in the software application.
  The visual indicator is a graphic code, such as a QR-code, or a barcode, or an image, or a digital photograph.
  The visual indicator is displayed on a screen of the equipment.
  Once the communication link is established, the software application of the electronic terminal is authorized to exchange data with the electronic controller of the equipment.
  The exchange of data between the electronic controller of the equipment involves the electronic terminal receiving data generated by the equipment, such as maintenance data.
  Once the communication link is established, the electronic controller of the equipment and the software application exchange data directly, without passing through another communication device.
  The target equipment is industrial equipment or agricultural equipment.

According to another aspect, the invention relates to a system, comprising equipment such as industrial or agricultural equipment and an electronic terminal, the electronic terminal being configured to implement steps consisting of:
  an image sensor of the electronic terminal acquiring an visual indicator image displayed by the equipment, the visual indicator comprising connection identifiers, in encoded form, for establishing a communication link with the equipment;
  a software application on the electronic terminal extracting the connection identifiers from the acquired image;
  the connection identifiers establishing a local wireless communication link between a communication interface of the electronic terminal and a communication interface of an electronic controller of the equipment.

BRIEF DESCRIPTION OF THE DRAWINGS

The invention will be better understood and other advantages thereof will become clearer in the light of the following description of an embodiment of a monitoring system, given only by way of example and made with reference to the appended drawings, in which.

DETAILED DESCRIPTION OF EMBODIMENTS

Figure 1:
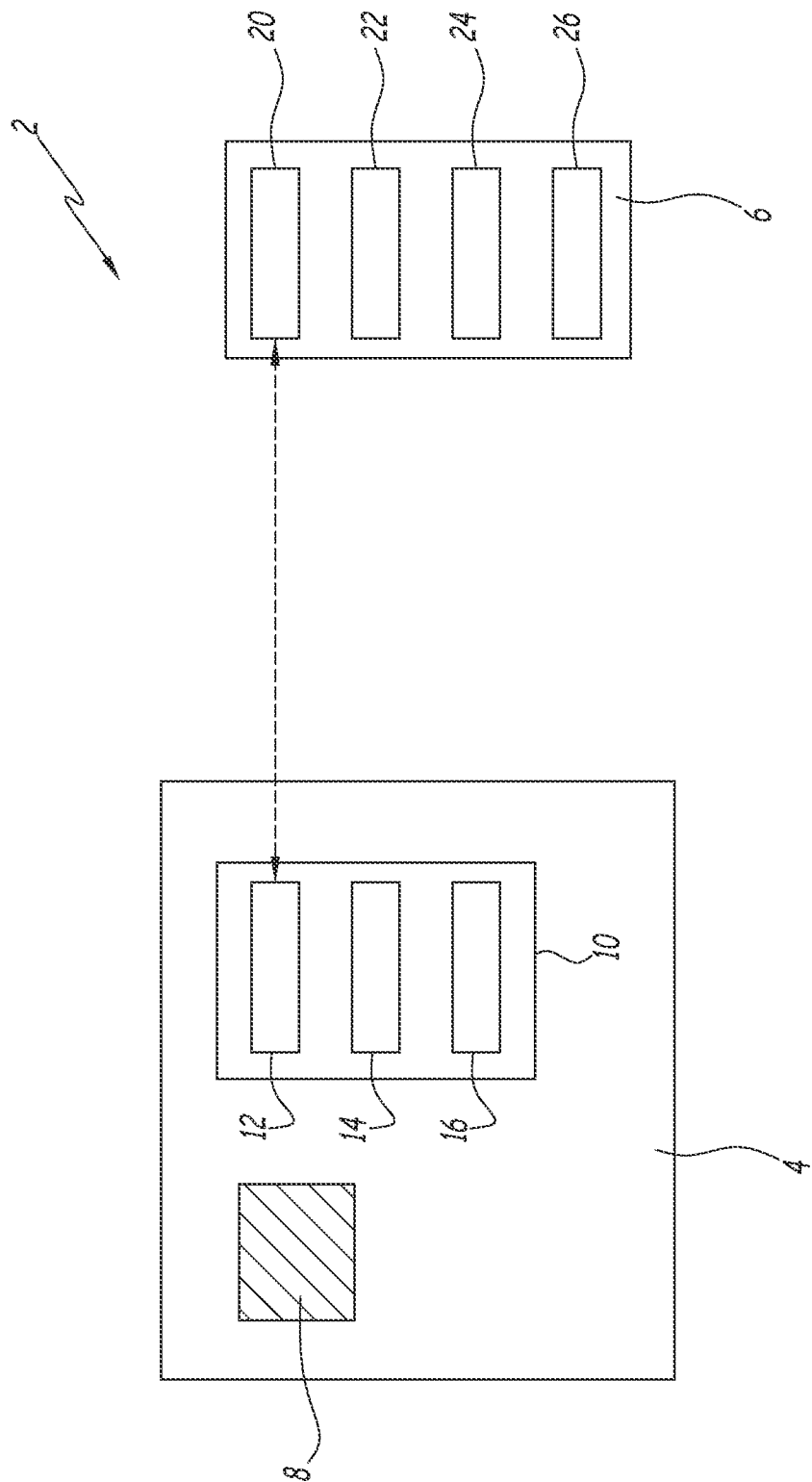
FIG. 1 shows schematically an example of a system related to an item of industrial or agricultural equipment with an electronic terminal, according to an embodiment of the invention.

FIG. 1 shows a system 2 related to an item of equipment 4 with an electronic terminal 6.

In many embodiments, the equipment 4 may be industrial equipment, such as a machine tool, or agricultural equipment, or any equivalent equipment or machine.

For example, the equipment 4 is an industrial painting machine in an industrial production line, particularly for the automotive industry.

In a variant, the equipment 4 could be an agricultural machine 4.

These examples are not limiting and the invention may in a variant be transposed to other types of equipment.

The electronic terminal 6 here is a user terminal. It may be a mobile communication device, such as a cell phone, in particular a smartphone, or a tablet computer, or a laptop computer, or any equivalent device.

In practice, the equipment 4 includes devices and components that enable it to perform one or more primary functions. These devices and components may be mechanical, or electromechanical, or electronic, or equivalent.

For example, in the case of an industrial equipment such as an industrial painting machine, the equipment 4 may comprise a paint spraying system as well as actuating and measuring components such as pumps, valves, sensors, such as flow meters, or any similar element.

However, these devices and components are not described in detail in the following.

The equipment 4 also includes a display screen 8, which is configured in particular to display a visual or graphical indicator such as a QR-code or a barcode, the role of which will be explained in detail in what follows.

For example, the display screen 8 is a liquid crystal display, or an organic light-emitting diode (OLED) display, or a display using any equivalent display technology.

The display screen 8 may be a touch screen, although this is not required.

The equipment 4 also includes an electronic controller 10, preferably configured to supervise and/or control the operation of the main components of the equipment 4.

In many embodiments, the electronic controller 10 is thus used to collect data generated by the equipment 4 during its operation, such as maintenance data relating to the state of wear of one or more components and devices of the equipment 4.

For example, in the previously mentioned case where the equipment 4 is an industrial painting machine, the maintenance data may relate to a number of cycles of use of certain mechanical or electromechanical components, such as valves or pumps.

This example is not limiting and other types of data may be defined, depending on the nature of the equipment 4 and its use.

In other example embodiments, the electronic controller 10 may authorize remote control of all or part of the equipment 4, based on control commands received via the communication interface 12.

The electronic controller 10 is coupled to the display screen 8 and includes a communication interface 12, a memory 14 and a processor 16.

For example, the processor 16 is a programmable microcontroller. The memory 14 includes executable instructions and/or software code, provided to implement one or more of the methods described below, when such instructions are executed by the processor.

The use of the term "processor" does not preclude at least some of the functions of the controller 10 being performed, in a variant, by a digital signal processor (DSP), or by a field-programmable gate array (FPGA) component, or by an application-specific integrated circuit (ASIC) or by any equivalent element.

The communication interface 12 is configured to make it possible to establish a wireless communication link with the electronic terminal 6. Preferably, the communication link is a radio link, particularly a short-range link.

For example, the communication link is a Wi-Fi link. In a variant, the communication link may be a Bluetooth® link or any suitable radio communication protocol.

In practice, the communication interface 12 may include a radio antenna, or may be connected to a radio transmit/receive device.

In the case where the communication link is a Wi-Fi link, then the communication interface 12 may be configured to function as a Wi-Fi access point allowing local access to the resources of the equipment 4. Preferably, access may be restricted by requiring the use of a password to allow a connection to be established.

Generally, the communication interface 12 is configured to establish a point-to-point communication link between the equipment 4 and the electronic terminal 6.

Preferably, the communication link is a local communication link, i.e. when the communication link is established between the electronic terminal 6 and the electronic controller 10, the exchanged data flows directly between the electronic terminal 6 and the electronic terminal 10 without transiting through another device such as a remote server, or without transiting through another communication network such as a local area network or through the internet.

The electronic controller 10 is configured to generate a visual or graphical indicator automatically, comprising connection identifiers in encoded form, allowing another device such as the electronic terminal 6 to establish a communication link with the communication interface 12, and thus with the equipment 4.

The visual or graphical indicator is preferably a matrix code such as a QR-code, but in a variant it could be a bar code, or an image, or a digital photograph, or any graphical information medium.

As used in this description, the term "in encoded form" means that the connection identifiers are encoded, or cyphered or encrypted in the graphical indicator, as will be understood in what follows.

In the following, the reference 8 may be used to designate the visual indicator displayed on the screen 8.

For example, the connection identifiers may include one or more of the following data that may be stored in the memory 14 of the electronic controller 10: a serial number of the equipment 4, a network address, a hardware identifier of the interface 12 (such as a MAC address), a password (including, but not limited to, a password expected by the interface 12 to authorize the establishment of a connection), or any appropriate data.

The electronic controller 10 is also configured to display the generated visual indicator on the display 8. The indicator may be displayed continuously, or it may be displayed only in response to a user action through an interface of the equipment 4 (such as pressing a button or touching a screen).

Preferably, if one or more of the connection identifiers is modified, then the electronic controller 10 can generate a new visual indicator containing the updated connection identifiers, and displays this new visual indicator 8 in place of the previous visual indicator.

As explained above, the visual indicator is encrypted or encoded by the electronic controller 10, i.e. the connection identifiers are encoded in the visual indicator in such a way that they are not directly readable or retrievable without possessing suitable encryption information, such as an encryption key.

This prevents unauthorized third parties from accessing the connection information.

As illustrated in FIG. 1, the electronic terminal 6 includes a communication interface 20, an image sensor 22, a processor 24, a memory and a software application 26.

Preferably, the communication interface 20 is compatible with the communication interface 12 of the electronic controller 10 of the equipment 4 and enables the establishment of the previously described communication link.

For example, the sensor 22 includes a camera.

The processor 24 plays a similar role here to the processor 14 of the electronic controller 10, so the description of it above can be transposed to the processor 24.

The application 26 may be executed by the processor 24 from software code and/or executable instructions stored in the memory of the electronic terminal 6.

Advantageously, the application 26 includes suitable encryption information, such as an encryption key, to extract the encrypted content of the visual indicator displayed on the screen 8.

The application 26 may also be programmed to display a human/machine interface on a screen of the electronic terminal 6, allowing a user to access the data and/or functionality of the equipment 4.

Generally speaking, the electronic terminal 6 is configured to implement steps, in particular by means of the software application 26, consisting of:
- the image sensor 22 acquiring a visual indicator image displayed by the screen 8;
- extracting connection identifiers from the acquired image, using said encryption information;
- using the connection identifiers, establishing a local wireless communication link between the communication interface 20 and the communication interface 12.

Figure 2:
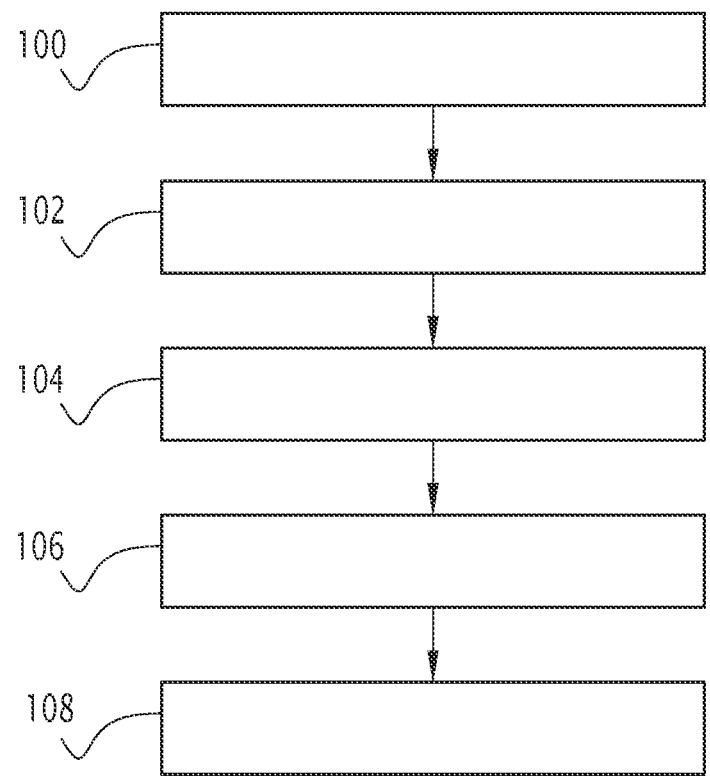
FIG. 2 shows schematically a method of connection between the electronic terminal and the industrial or agricultural equipment of FIG. 1, according to an embodiment of the invention.

FIG. 2 shows an example of a method for establishing a communication link between the electronic terminal 6 and the equipment 4 ("target equipment").

The method begins in a step 100, with a request from a user to establish a communication link between the electronic terminal 6 and the equipment 4.

For example, to send the request, the user acts on the human/machine interface provided by the application 26 by pressing an interface element such as a button or a menu.

The image sensor 22 is then activated. Preferably, the electronic terminal 6 is approached by the user to the equipment 4.

Then, in a step 102, an image of the visual indicator 8 displayed by the equipment 4 is acquired by the image sensor 12.

For example, the acquired image may be processed by software functions or routines of a program of the electronic terminal 6 to pre-process the acquired image and apply corrections (remove edges, filter out defects, etc.) and to convert the information in graphic form by the QR or bar code into information in another form such as as a character string. These operations can be performed with known functions. However, at this stage, the extracted data is not immediately usable, and it is not possible to access the connection identifiers in particular, which are still in encrypted form.

Then, in a step 104, the connection identifiers are extracted from the acquired image, this extraction being performed using the software application 26.

Preferably, as the connection identifiers are encrypted in the visual indicator, the connection identifier extraction from the acquired image is performed using the encryption information contained in the software application.

It is understood here that this encryption information, such as the encryption key, is previously stored in the software application 26, by an editor of the application 26, for example. It is also understood that the controller 10 has corresponding encryption information, and the connection identifiers are encrypted and encoded in the visual indicator 8 with this information.

Then, in a step 106, the electronic terminal 6 establishes the local wireless communication link, by means of the extracted connection identifiers, between the communication interface 20 of the electronic terminal and the communication interface 12 of the electronic controller 10.

In the illustrated example, in a step 108, once the communication link is established, the software application 26 of the electronic terminal is allowed to exchange data with the electronic controller 10.

Specifically, the electronic controller 10 of the equipment and the software application 26 exchange data directly, without passing through another communication device or communications network. In other words, the communication link is a point-to-point link.

According to examples, the data exchange between the electronic controller of the equipment includes the receipt of data generated by the equipment, such as maintenance data, by the electronic terminal.

In particular, the application 26 of the electronic terminal 6 can generate alerts or display notifications to the user when an abnormal operation is detected on the equipment 4, or when a preventive maintenance operation is identified as being necessary, for example, such as when the wear level of a part or component of the equipment exceeds a predefined threshold.

According to other examples, the application 26 of the electronic terminal 6 can send command commands to the controller 10, in order to remotely control the equipment 4.

With the invention, a communication link between an item of equipment 4 and an electronic terminal 6 can be established in a simple and quick manner by a user. The connection identifiers required to establish the communication are displayed by the equipment, and can be captured automatically by the terminal 6, while being protected and safe from interception by an unauthorized third party. Thus, only authorized users having the application 26 can connect to the equipment 4.

In addition, the fact that the connection link is a point-to-point, local and preferably short-range link is particularly advantageous from a security point of view, as it prevents information from passing through equipment or networks belonging to third parties. Furthermore, the connection can be established directly, even when no external network is available, which is useful when the equipment is in a remote location, which is sometimes the case with agricultural machinery.

Many other embodiments are possible.

In a variant, the steps of the methods described above could be performed in a different order. Some steps could be omitted. The described examples do not preclude other steps being implemented in conjunction and/or sequentially with the described steps, in other embodiments.

The embodiments and variants contemplated above may be combined with each other to create new embodiments.

The invention claimed is:

1. A method for connecting to an industrial painting machine by means of an electronic terminal comprising:
   acquiring an image of a graphic code displayed by the industrial painting machine, using an image sensor of the electronic terminal, the graphic code encoding connection identifiers for establishing a communication link with the industrial painting machine;

extracting the connection identifiers from the acquired image, using a software application installed on the electronic terminal;

establishing a local wireless communication link between a communication interface of the electronic terminal and a communication interface of an electronic controller of the industrial painting machine, using the connection identifiers; and once the communication link is established, exchanging data with the electronic controller of the industrial painting machine, by the software application, comprising receiving data generated by the industrial painting machine, by the electronic terminal, the generated data comprising maintenance data of the industrial painting machine.

2. The method according to claim 1, wherein the communication link is a radio link.

3. The method according to claim 1, wherein the connection identifiers encoded as a graphic code are encrypted, so that the connection identifiers are not directly readable by decoding the graphic code without possessing suitable encryption information, and wherein said extracting comprises using the suitable encryption information contained in the software application for extracting the encrypted connection identifiers.

4. The method according to claim 1, wherein the graphic code is displayed on a screen of the industrial painting machine.

5. The method according to claim 1, wherein, once the communication link is established, the electronic controller of the industrial painting machine and the software application exchange data directly, without transiting through another communication device.

6. A system, comprising:
an industrial painting machine; and
an electronic terminal configured to implement a method comprising:
acquiring an image of a graphic code displayed by said industrial painting machine, using an image sensor of the electronic terminal, the graphic code encoding connection identifiers for establishing a communication link with said industrial painting machine;

extracting the connection identifiers from the acquired image using a software application installed on the electronic terminal;

establishing a local wireless communication link between a communication interface of the electronic terminal and a communication interface of an electronic controller of said industrial painting machine using the connection identifiers; and once the communication link is established, exchanging data with the electronic controller of said industrial painting machine by the software application of the electronic terminal, comprising receiving data generated by said industrial painting machine, by the electronic terminal, the generated data comprising maintenance data of said industrial painting machine.

7. The method according to claim 2, wherein the radio link is a short range radio link.

8. The method according to claim 7, wherein the short range radio link comprises a Bluetooth link or a Wi-Fi link.

9. The method according to claim 1, wherein the graphic code comprises a QR-code, a barcode, an image or a digital photograph.

10. The method according to claim 1, wherein the maintenance data relates to the state of wear of one or more components and devices of the industrial painting machine.

11. The system according to claim 6, wherein the connection identifiers encoded as a graphic code are encrypted, so that the connection identifiers are not directly readable by decoding the graphic code without possessing suitable encryption information, and wherein said extracting comprises using the suitable encryption information contained in the software application for extracting the encrypted connection identifiers.

* * * * *